United States Patent
Duncan et al.

(10) Patent No.: US 8,009,227 B2
(45) Date of Patent: Aug. 30, 2011

(54) METHOD AND APPARATUS FOR REDUCING DEVICE AND SYSTEM POWER CONSUMPTION LEVELS

(75) Inventors: Ed Duncan, Gairloch (GB); Andrew Maginnis, Edinburgh (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 982 days.

(21) Appl. No.: 11/672,119

(22) Filed: Feb. 7, 2007

(65) Prior Publication Data

US 2007/0222887 A1 Sep. 27, 2007

(30) Foreign Application Priority Data

Feb. 8, 2006 (EP) .................................... 06002544

(51) Int. Cl.
*H04N 5/225* (2006.01)
*H04N 5/222* (2006.01)

(52) U.S. Cl. .................................. 348/372; 348/333.13

(58) Field of Classification Search .............. 348/20.16, 348/211.4–211.6, 333.13, 372, 208.16
See application file for complete search history.

(56) References Cited

U.S. PATENT DOCUMENTS

| 5,452,434 | A | * | 9/1995 | MacDonald | 713/601 |
| 5,675,282 | A | * | 10/1997 | Saito | 327/544 |
| 7,471,333 | B2 | * | 12/2008 | Steimle et al. | 348/372 |
| 2005/0231620 | A1 | | 10/2005 | Fraenkel et al. | 348/308 |
| 2005/0270369 | A1 | | 12/2005 | Nonaka | 348/61 |

* cited by examiner

*Primary Examiner* — David Ometz
*Assistant Examiner* — Carramah J Quiett
(74) *Attorney, Agent, or Firm* — Lisa K. Jorgenson; Allen, Dyer, Doppelt, Milbrath & Gilchrist, P.A.

(57) ABSTRACT

A method of managing power consumption in a device, such as a video image processing device for processing data from one or more pixels, includes forming a frame of an image. The method further includes determining one or more regions of interest in the image, identifying one or more pixels located in the one or more regions of interest, and processing the one or more identified pixels in a predetermined manner. Power for at least part of the device is switched off if no pixels are identified in a region of interest within a predetermined period of time.

22 Claims, 6 Drawing Sheets

METHOD AND APPARATUS FOR REDUCING DEVICE AND SYSTEM POWER CONSUMPTION LEVELS

FIELD OF THE INVENTION

The present invention relates to a method and apparatus for reducing device and system power consumption levels, particularly but not exclusively for camera based devices using smart processing and interpretation of image data, such as video image data.

BACKGROUND OF THE INVENTION

There are more and more devices that are battery-powered and which have high power consumptions. Efforts are being made to either improve the performance of the battery or reduce the power consumption of the devices. Mobile phones are one such portable battery-powered devices where lower power design strategies are needed to save energy and maximize battery life.

Video cameras in battery-powered applications remain a relatively new area to this problem, and thus traditional approaches to reducing active power have been generally applied. Recently, efforts have been made in the design and manufacture of semiconductors for these applications in order to make them more power efficient.

In one such example, deep sub-micron CMOS silicon processes provide reduced voltage (V) in an effort to positively impact the power equation $(CV^2 f)/2$, where C is capacitance, V is voltage and f is frequency. The voltage V is a dominant factor. In another example, digital IC design CAD vendors provide automatic clock gating tools to tackle instantaneous power issues by introducing heavily loaded, capacitive clock-trees.

Generally, in system design the frequency component of operation is somewhat constrained by the system specification but can, in some applications, be reduced resulting in an approximately linear reduction in active power.

These examples provide some improvements but do not generally go far enough for the high expectations with respect to power efficiency with these types of devices. Also, maximizing image performance and battery life continue to be significant product differentiating features in portable, battery-powered camera markets.

SUMMARY OF THE INVENTION

According to one aspect of the present invention, a method of managing power consumption in a device, such as a video image processing device for processing data from one or more pixels forming a frame of an image, comprises the steps of determining one or more regions of interest in the image, identifying one or more pixels located in the one or more regions of interest, and processing the one or more identified pixels in a predetermined manner. The method may further comprise switching off the power for at least part of the device if no pixels are identified for a predetermined period of time.

This has an advantage for phones or other devices equipped with digital cameras (or image sensors) in that it is possible to apply on-the-fly image interpretation and processing to dynamically reduce power consumption of the camera function itself and downstream system components.

An element of intelligence related to video frame construction and active image data which extends the ability to reduce power consumed by clock-trees as well as dynamically reducing frequency and supply voltage components may be introduced.

Also, reduced power leads to reduced heat in the system and produces a further benefit of increasing performance of the image system signal to noise ratio (SNR). This is achieved by reducing thermally excited noise as well as switching supply noise.

When these techniques are readily applied to fully integrated CMOS image sensor designs, the following effects may be produced: a relaxed power supply specification that leads to lower cost; reduced on-chip heat, internal switching noise and leakage that leads to an improved SNR; and prolonged battery life.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
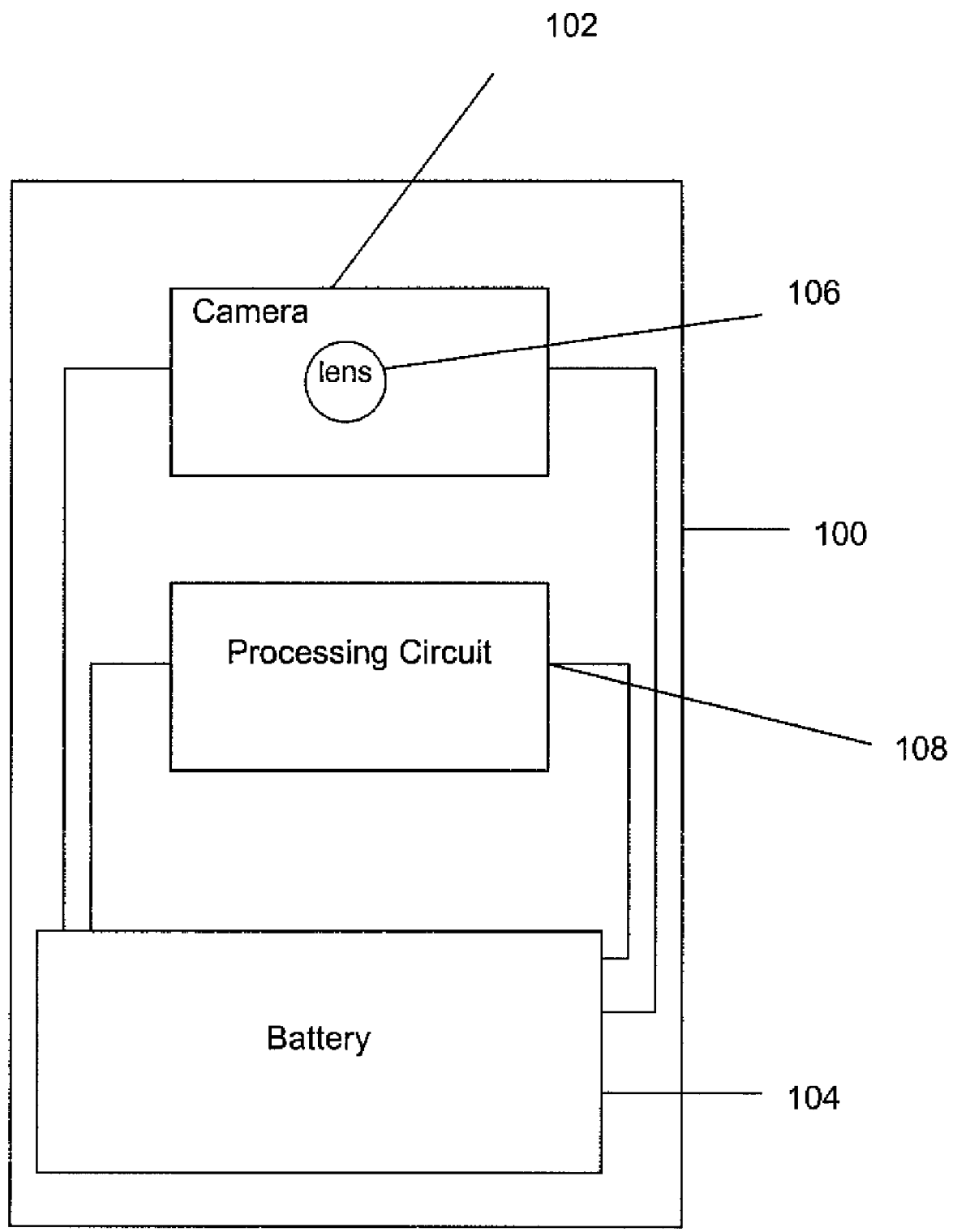
FIG. 1 is a block diagram of a device having an image sensor according to the present invention.

Referring to FIG. 1 there is shown a block diagram of a device 100. The device may be a mobile phone, a personal digital assistant (PDA), another hand held device or any other appropriate device. The device includes a camera (video or other moving image) 102 and a battery 104. The camera includes a lens 106 or other device for capturing images. The camera is preferably a video camera, but the invention will apply similarly to other types of cameras. A processing circuit 108 including a processor, memory, etc. is also included. The camera and processing circuit are connected to the battery which provides the power for both in operation.

Figure 2:
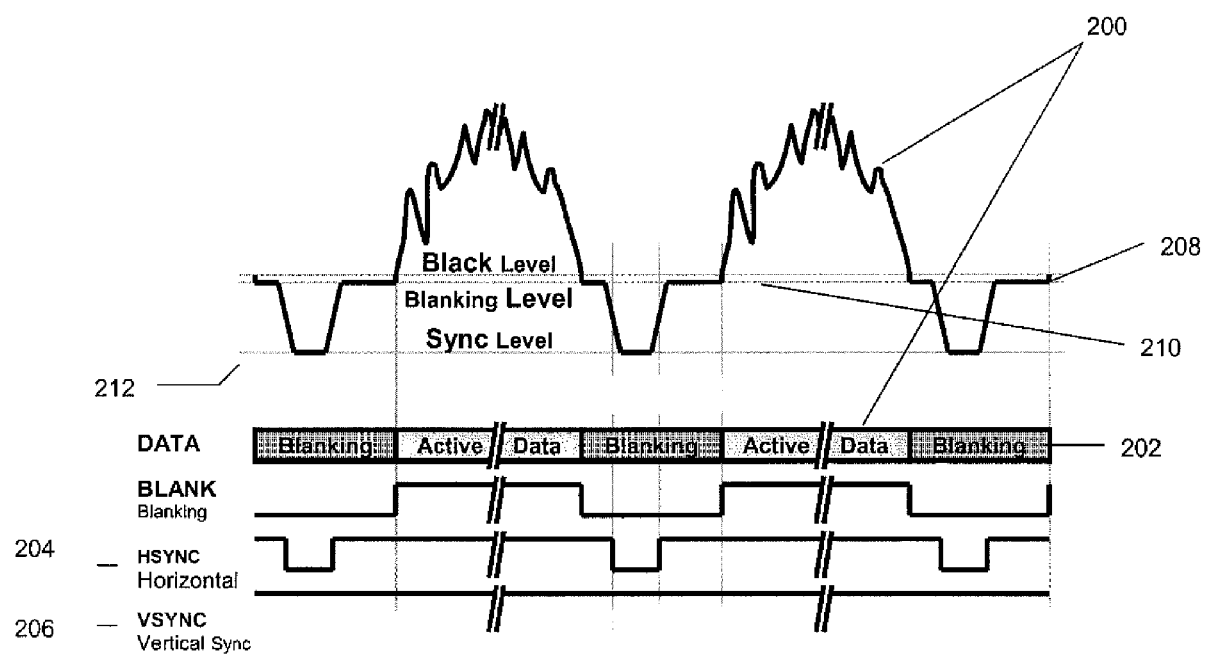
FIG. 2 is a diagram showing details and characteristics of a video waveform according to the prior art.

FIG. 2 shows a classic video waveform such as might be produced in the camera of FIG. 1. The waveform shows the actual active or image portion of the data in the camera (active data) 200. In addition, the waveform includes other key information which enables subsequent recognition and processing of the active data. This is all the information required in order to view an image from the camera on a target system, such as cathode ray tube (CRT), a digital frame grabber or the like. Examples of the key information include: video blanking 202; synchronization timing (HSYNC and VSYNC) 204, 206; black level 208; blanking level 210; and sync level 212.

Figure 3:
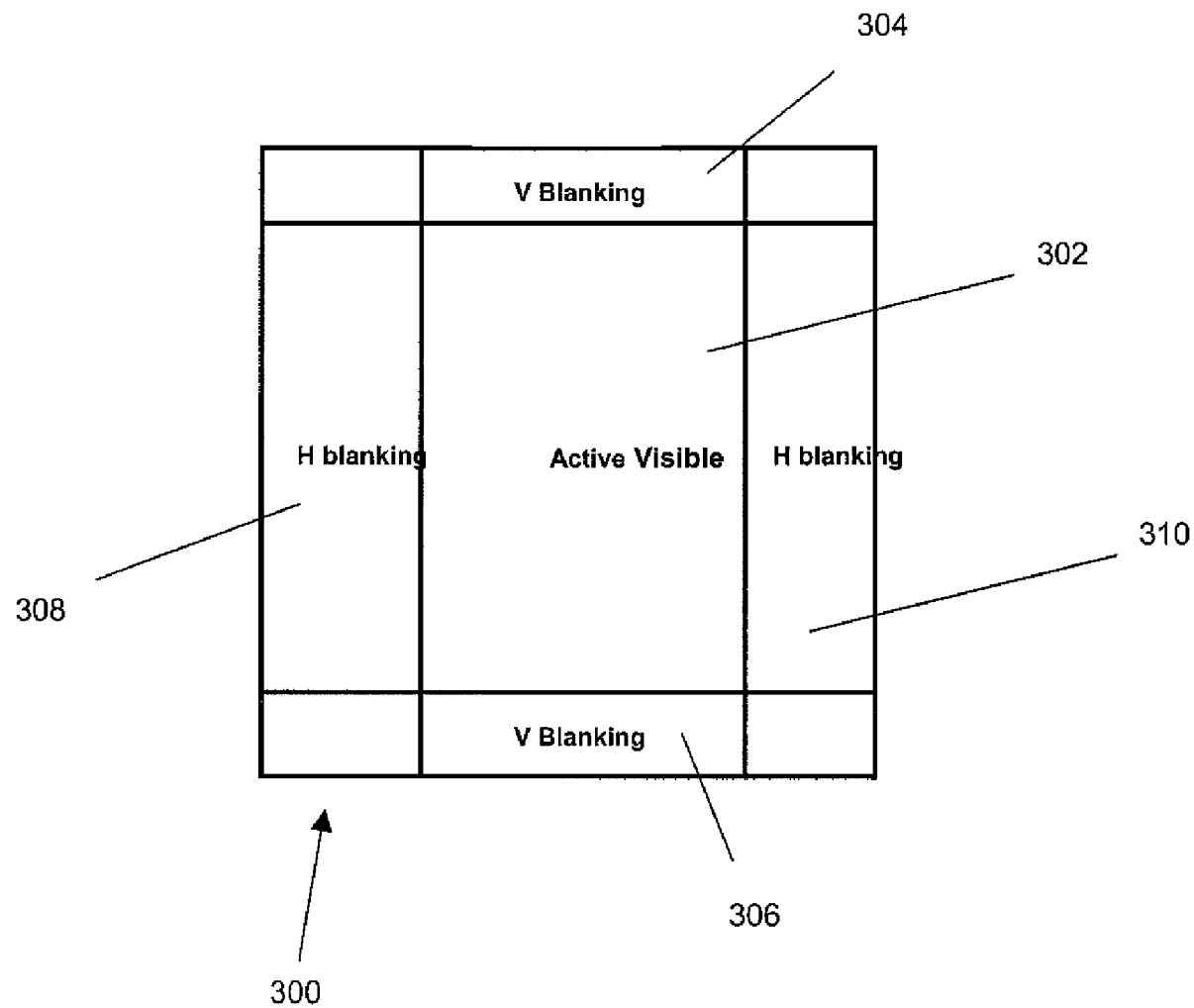
FIG. 3 is a two-dimensional representation of a video waveform according to the prior art.

This classic video waveform is often represented in a two dimensional representation which is used to simplify the presentation of an entire video field 300. This representation is shown in FIG. 3. The representation shows the following areas: active visible 302; vertical blanking 304, 306; and horizontal blanking 308, 310.

More sophisticated video waveforms often include additional data types both in and out of the active video region.

Teletext data transmitted in the non-visible area of the video signal is a good example of information which is frequently used in terrestrial television signal broadcasting.

Figure 4:
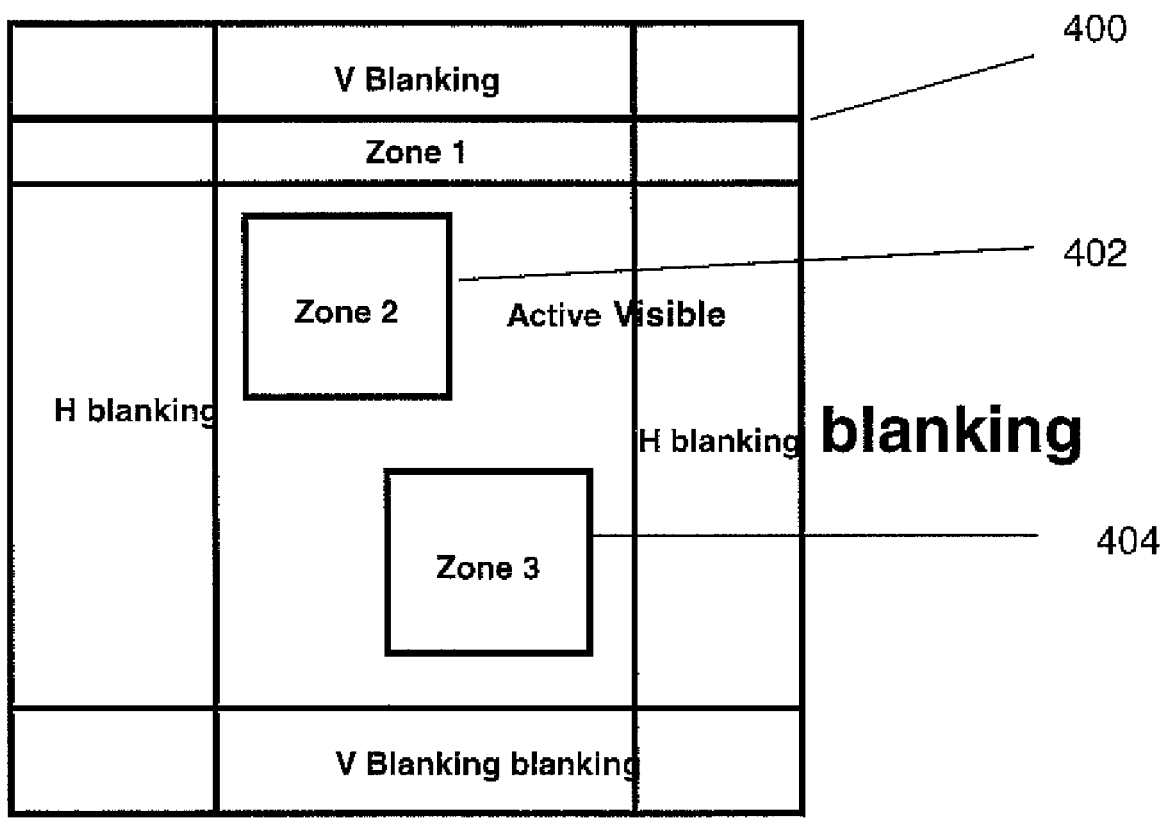
FIG. 4 is a two-dimensional representation of a video waveform showing image sensor regions according to one aspect of the present invention.

Referring now to FIG. 4 a similar two dimensional representation is shown in accordance with the present invention. In addition to the horizontal, vertical and active image regions presented in FIG. 3, the representation includes Zone 1 400, Zone 2 402 and Zone 3 404. These zones represent regions of interest in the image, and their function will be described in greater detail below. It will be appreciated that the zones could be in other positions than those indicated.

Figure 5:
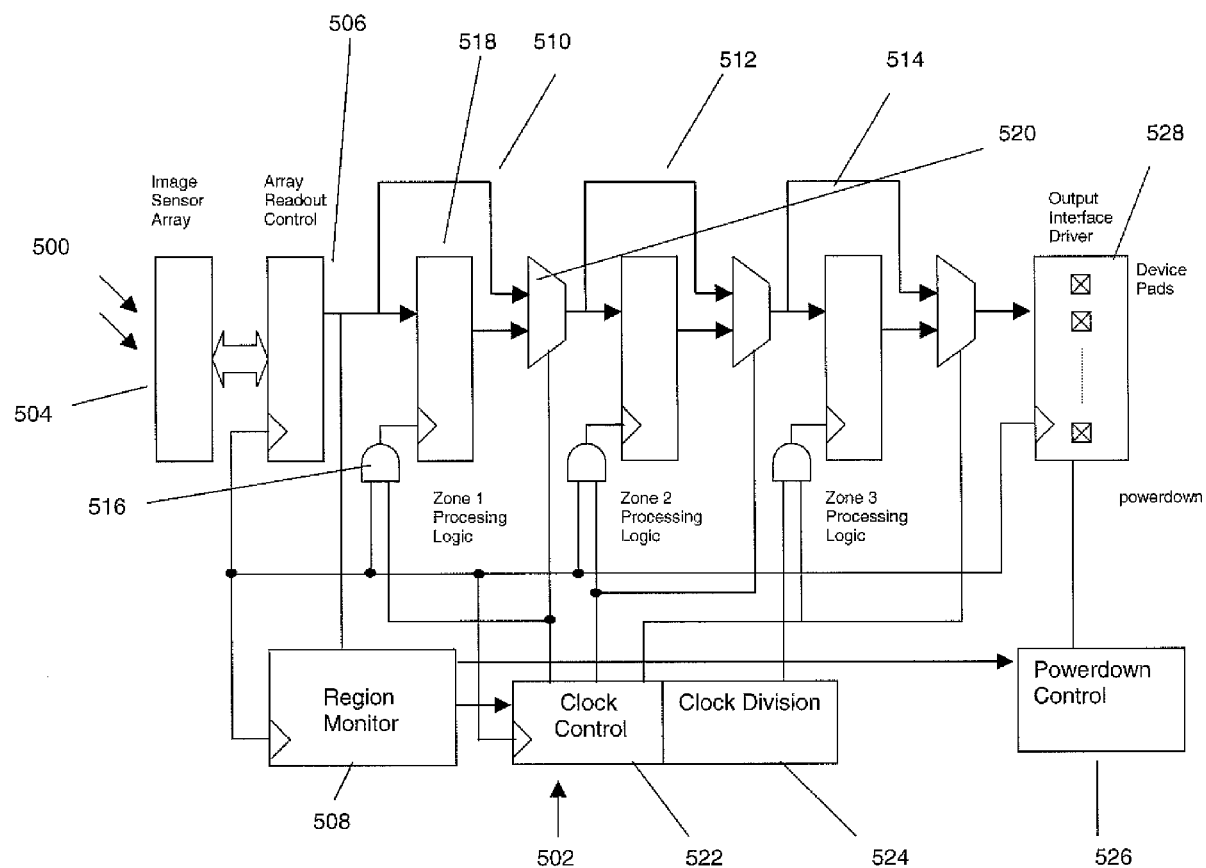
FIG. 5 is a circuit diagram of an example of an image system readout and raster scan processing circuit according to another aspect of the present invention.

In order for the two dimensional image to be processed using an image sensor, it is important to consider the various regions of interest where data is read out during dedicated processing or manipulation in order to display and use the image for whatever purpose. Traditionally in an image sensor, video data will be read out sequentially (raster-fashion) from an array. The data will then be processed using an appropriate processing circuit. FIG. 5, shows a processing circuit in accordance with the present invention. FIGS. 4 and 5 shall now be used to describe the detail of the low power consumption processing.

Video data 500 arrives at the processing circuit 502 from a source. This source can be any appropriate means including a camera or other image capture device. The video is stored in an image sensor array of pixels 504. At the start of processing the video data is read out from the array and through an array readout controller 506 to a region monitor 508. The region monitor is used to determine where the video data comes relative to the whole video field as shown in FIG. 4. For example, the region monitor may identify that the data came from zones 1, 2 or 3. The region monitor includes a counter and decoder logic to enable it to track the current pixel being read out with respect to the image field. The region monitor can be adjusted to decode any number of static or dynamic regions in the image. In the examples of FIG. 4, three regions of interest (zones) are shown and identified.

When the region monitor detects and/or determines that the pixel being processed is in one of the regions of interest, the pixel is transmitted for further processing during which time the processing blocks are activated, as will be described in greater detail below. However, if the pixel is not in a region of interest the processing is stopped and the relevant processing block or blocks are powered down. This detection is determined in any reasonable manner, such as by determining the location of both the pixel being processed and all or any regions of interest.

When the region monitor identifies data from zone 1 it switches on the zone 1 processing block 510. Similarly for data from zone 2 and zone 3 the processing blocks 512 and 514 are respectively activated. The processing blocks each comprise a logic AND gate 516, a sequential block IP 518 and a multiplexer (MUX) 520. The respective processing blocks are each adapted to carry out processing which is relevant to the particular zone to which they are associated. For example, if zone 1 is a blanking interval zone the processor will be the blanking interval processing block.

Regarding the nature of each zone as identified in FIG. 4 these could be any part of the picture or key information which is important to the user, or which is required for a particular output device or purpose. By way of example, zones 1, 2 and 3 are described as follows.

Zone 1 is the area of the video field where processing and insertion of data, such as teletext, is performed. Zone 1 is the only place in which this data can be found, and thus outside the area processing teletext data and can be safely disabled.

Zone 2 is a region of interest where pixel statistics are processed or gathered. Zone 2 is the only place in which this data can be found, and thus outside the area processing pixel statistics data and can be safely disabled.

Zone 3 is a picture-in-picture window where a second scaled image is substituted over the original image. Zone 3 is the only place in which this data can be found, and thus outside the area processing picture-in-picture data and can be safely disabled.

The region monitor includes means or a circuit (not shown) for knowing the details of the image and the position of the regions of interest or zones, as well as the pixel which is being processed at any time. This can include the following: a program loaded into the region monitor or remote therefrom; a lookup table; a list of zone coordinates; a map of the image field or any other appropriate means.

The region monitor also includes control circuitry (not shown) which can dynamically enable a clock controller 522 and clock division circuitry 524. The clock control is used to switch on the relevant processing block at the appropriate time and to power down the processing circuit when the zone has been passed. It will be appreciated that as the raster scan of an image passes there will be a number of times that the processing circuit is powered up and down, particularly with zones 2 and 3 in the example given. It is possible that the timing control may be controlled in a different manner, but the main feature is that the processing circuit is only powered up when it is actually required for processing is maintained. This limits clock tree power to be utilized only when a zone is active. This has the effect of reducing the C component of the power equation mentioned above.

A clock tree is a signal that fans out all the clock ports of the sequential elements within its domain. When this is physically generated the tree is a buffer, and each buffer has a limited drive strength. This gives a physical structure which includes branches, subbranches, sub-subbranches, etc. This means that the clocks are gated which reduces the power although the clock tree will still consuming power. Accordingly, gate control is provided at a high system level which reduces the power used by the clock tree to a still greater degree If required, the clock rate can also be dynamically adjusted. In many cases, when scaling image data, e.g., for a small picture-in-picture, it may be possible to reduce the effective clock rate for a given block, for example as in zone 3 in this example. This has the effect of further limiting power by dynamically reducing the clock rate to a minimum, thereby acting to address the F component of the power equation.

The region monitor is connected to a power down controller 526, which powers down any devices, drivers, etc. when the zone processing circuits are not in operation. For example, in FIG. 5 the output of each processing circuit passes to an output interface driver 528 which passes the processed data on to any appropriate output device (not shown). When the processing circuits are not processing data the power down controller powers down the output interface drive which reduces supply voltage requirements, thereby saving still more power by addressing the V component of the power equation.

Figure 6:
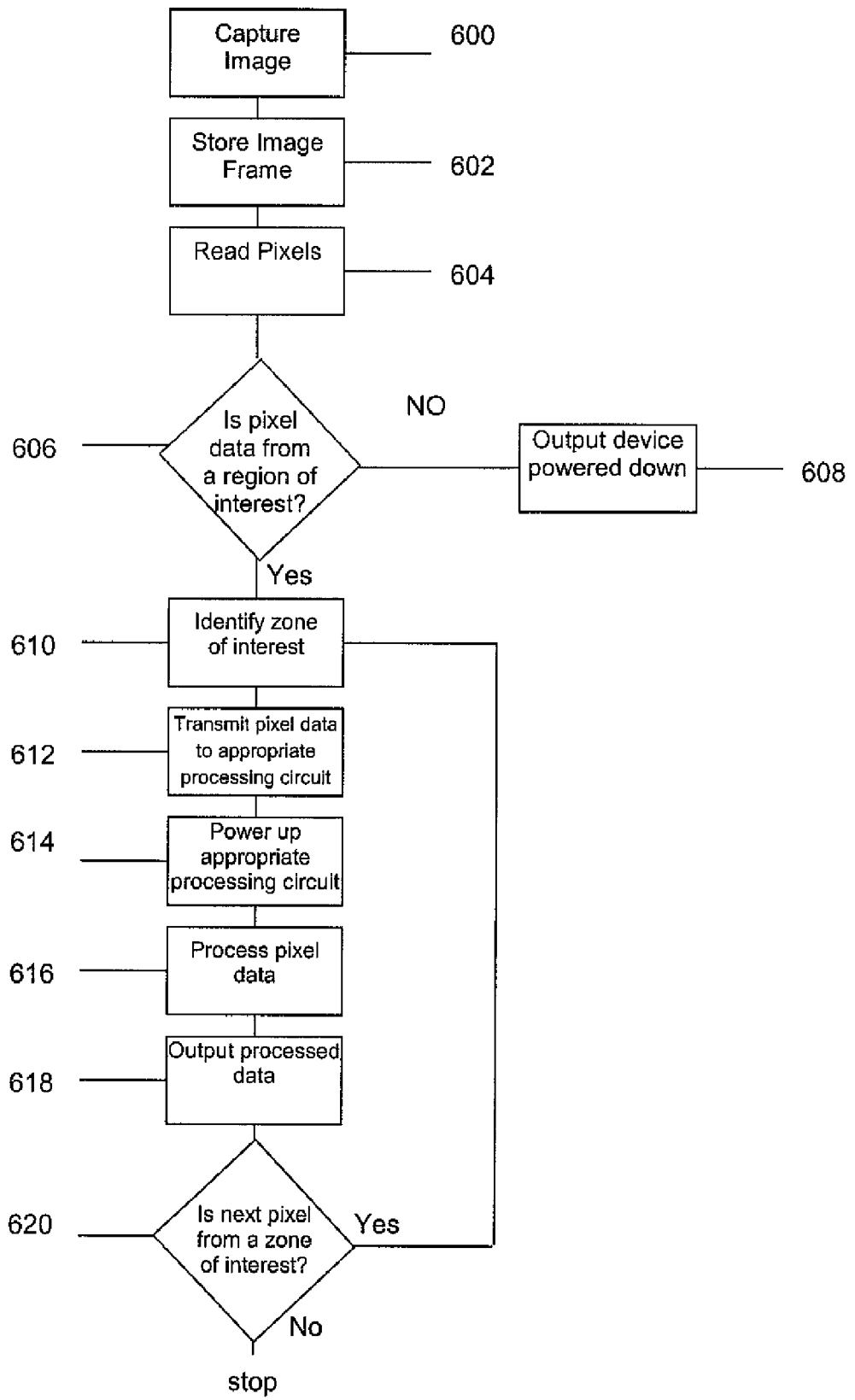
FIG. 6 is a flow diagram showing the main method steps according to the present invention.

FIG. 6 shows a flow chart of the steps of the process carried out in accordance with the invention. An image is captured using an image capturing device such as a video camera (step 600). The video image is made up of a number of frames per second. These frames may be processed, but for simplicity, the remainder of this part of the description will relate to processing just one frame.

The image frame is stored in an image sensor array (step 602). The pixels from the array are then read out sequentially via an array read out controller (step 604). The pixel data is then analyzed to determine whether it is a pixel from a region of interest or not (step 606). If the pixel is not from a region of interest further processing is not carried out on the pixel, and the output data is not used and the output device is powered down (step 608).

The further processing of the data from the pixel from a region of interest proceeds as follows. The particular zone of interest of the pixel is identified (step 610) and the pixel data is transmitted to the appropriate procession circuit (step 612). As the data from the pixel is passed to the appropriate processing circuit, that circuit and the output interface driver are powered up (step 614).

The data from the pixel is processed (step 616) and output (step 618). The processing circuit and output interface driver may then be powered down, unless the following pixel is from a region of interest and then the power stays up (step 620) and the process continues at step 610. It will be appreciated that not all the regions of the image are in fact optical elements such as a pixel, but may include other elements, for example, elements including formatting information. For simplicity, pixel as used throughout includes all elements relating to an image field, optical formatting or otherwise.

The example presented relates to a video image and a raster scanning processing procedure. However, it will be appreciated that the type of image and the procedure may be varied as appropriate for the device and image type which is being considered. The regions of interest in the present example are also not restricted. The regions could be different, user selected or controlled in some other way. If the regions of interest change so too will the processing block so that they correspond. The processing circuitry may vary in detail of construction but will be capable of carrying out the same functionality described above, and will include the variations necessary to meet the specific image and procedure requirements.

There may be a time delaying powering down of any device if the pixel is not in a region of interest. This is to avoid switching the power on and off too many times if there are too many changes from regions of interest to regions of no interest. In addition, a circuit for detecting that there have been predetermined thresholds of pixels not in a region of interest to effect the power down may be included.

That which is claimed:

1. A method for managing power consumption in a video image processing device that processes video data of an image, the video image processing device comprising a region monitor, and a plurality of processing blocks, with each processing block corresponding to are ion of interest for processing a particular function of the video data, the method comprising:

receiving the video data at the region monitor to determine a location of the video data relative to a video field of the image;

determining if the location of the video data is in at least one region of interest in the image, with the at least one region of interest having a particular function associated therewith;

identifying if there is at least one pixel in the video data if the location of the video data is in the at least one region of interest;

processing at least one identified pixel in the video data in the at least one region of interest, the processing comprising selecting the processing block corresponding to the particular function associated with the at least one region of interest; and switching off power within a period of time for the plurality of processing blocks that do not correspond to the particular function associated with the at least one region of interest.

2. The method of claim 1, further comprising:

detecting a type of pixel for each pixel identified in the at least one region of interest; and transmitting pixels of a same type to a processing block corresponding to that pixel type.

3. The method of claim 2, wherein the switching off power comprises switching off power to processing blocks that does not correspond to the type of pixel detected.

4. The method of claim 2, wherein if there were no pixels identified in the at least one region of interest within the period of time, then the switching off power comprises switching off power to the respective processing blocks for each region of interest.

5. The method of claim 1, wherein determining the at least one region of interest in the image comprises:

selecting at least one zone of the image where there is information required to be processed;

identifying location of each selected zone within a frame of the image; and storing the location of each zone.

6. A power consumption controller for an image processing device processing video data of an image, the power consumption controller comprising:

a first detector for determining a location of the video data relative to a video field of the image;

a second detector for determining if the location of the video data is in at least one region of interest in the image, with the at least one region of interest having a particular function associated therewith, and for identifying if there is at least one pixel in the video data if the location of the video data is in the at least one region of interest;

processing circuitry comprising a plurality of processing blocks for processing at least one identified pixel in the video data in the at least one region of interest, the processing comprising selecting the processing block corresponding to the particular function associated with the at least one region of interest; and a power manager for switching off power within a period of time for said plurality of processing blocks that do not correspond to the particular function associated with the at least one region of interest.

7. The power consumption controller of claim 6, wherein the at least one region of interest comprises a plurality of regions of interest, and each pixel in a different region of interest is of a different type pixel.

8. The power consumption controller of claim 7, wherein said first detector detects a type of pixel for each pixel identified in the at least one region of interest, and transmits pixels of a same type to said processing block corresponding to that pixel type.

9. The power consumption controller of claim 7, wherein said power manager switches off power to said processing blocks that do not correspond to the type of pixel detected.

10. The power consumption controller of claim 6, further comprising a clock for controlling timing of said processing circuitry and said power manager.

11. A power consumption controller for an image processing device, comprising:

a first detector for determining a location of video data relative to a video field of a received image;

a second detector for determining if the location of the video data is in at least one region of interest in the image, with the at least one region of interest having a particular function associated therewith, and for identifying if there is at least one pixel in the video data if the location of the video data is in the at least one region of interest;

processing circuitry comprising a plurality of processing blocks for processing at least one identified pixel in the video data in the at least one region of interest, the processing comprising selecting the processing block corresponding to the particular function associated with the at least one region of interest; and a power manager for switching off power within a period of time for said plurality of processing blocks that do not correspond to the particular function associated with the at least one region of interest.

12. The power consumption controller of claim 11, wherein the at least one region of interest comprises a plurality of regions of interest, and each pixel in a different region of interest is of a different type pixel.

13. The power consumption controller of claim 12, wherein said first detector detects a type of pixel for each pixel identified in the at least one region of interest, and transmits pixels of a same type to said processing block corresponding to that pixel type.

14. The power consumption controller of claim 12, wherein said power manager switches off power to said processing blocks that do not correspond to the type of pixel detected.

15. The power consumption controller of claim 11, further comprising a clock for controlling timing of said processing circuitry and said power manager.

16. An image processing device, comprising:
an image sensor array for providing at least one pixel forming an image; and
a power consumption controller comprising
a first detector for determining a location of video data relative to a video field of the image,
a second detector for determining if the location of the video data is in at least one region of interest in the image, with the at least one region of interest having a particular function associated therewith, and for identifying if there is at least one pixel in the video data if the location of the video data is in the at least one region of interest, processing circuitry comprising a plurality of processing blocks for processing at least one identified pixel in the at least one region of interest, the processing comprising selecting the processing block corresponding to the particular function associated with the at least one region of interest, and a power manager for switching off power within a period of time for said plurality of processing blocks that do not correspond to the particular function associated with the at least one region of interest.

17. An image processing device of claim 16, wherein the at least one region of interest comprises a plurality of regions of interest, and each pixel in a different region of interest is of a different type pixel.

18. An image processing device of claim 16, wherein said first detector detects a type of pixel for each pixel identified in the at least one region of interest, and transmits pixels of a same type to said processing block corresponding to that pixel type.

19. An image processing device of claim 16, wherein said power manager switches off power to said processing blocks that do not correspond to the type of pixel detected.

20. An image processing device of claim 16, wherein said a power consumption controller further comprises a clock for controlling timing of said processing circuitry and said power manager.

21. An image processing device of claim 16, wherein said image sensor array is configured so that the image processing device is a camera.

22. An image processing device of claim 16, wherein said image sensor array is part of a camera, and further comprising a transceiver so that the image processing device is configured as a telephone with the camera.

* * * * *

UNITED STATES PATENT AND TRADEMARK OFFICE
CERTIFICATE OF CORRECTION

| | | |
|---|---|---|
| PATENT NO. | : 8,009,227 B2 | Page 1 of 1 |
| APPLICATION NO. | : 11/672119 | |
| DATED | : August 30, 2011 | |
| INVENTOR(S) | : Duncan et al. | |

It is certified that error appears in the above-identified patent and that said Letters Patent is hereby corrected as shown below:

Column 3, Line 67        Delete: "and"

Column 4, Line 4         Delete: "and"

Column 4, Line 8         Delete: "and"

Column 4, Line 29        Insert: --to be-- after "is"

Column 4, Line 39        Delete: "consuming"
                         Insert: --consume--

Column 4, Line 42        Delete: "degree"
                         Insert: --degree.--

Column 5, Line 53        Delete: "are ion"
                         Insert: --a region--

Column 6, Line 14        Delete: "does"
                         Insert: --do--

Column 6, Line 26        Insert: --a-- after "identifying"

Column 8, Line 31        Delete: "a power"
                         Insert: --power--

Signed and Sealed this
Sixth Day of March, 2012

David J. Kappos
*Director of the United States Patent and Trademark Office*